(12) United States Patent
Uniyal

(10) Patent No.: US 12,355,814 B2
(45) Date of Patent: Jul. 8, 2025

(54) GAMIFICATION OF TRAINING FOR PHISHING PREVENTION IN METAVERSE

(71) Applicant: Bank of America Corporation, Charlotte, NC (US)

(72) Inventor: Rahul Uniyal, Dehradun Uttarakhand (IN)

(73) Assignee: Bank of America Corporation, Charlotte, NC (US)

( * ) Notice: Subject to any disclaimer, the term of this patent is extended or adjusted under 35 U.S.C. 154(b) by 160 days.

(21) Appl. No.: 18/374,055

(22) Filed: Sep. 28, 2023

(65) Prior Publication Data
US 2025/0112953 A1    Apr. 3, 2025

(51) Int. Cl.
*H04L 29/06* (2006.01)
*G06T 19/00* (2011.01)
*G09B 5/06* (2006.01)
*H04L 9/40* (2022.01)

(52) U.S. Cl.
CPC ........ *H04L 63/1483* (2013.01); *G06T 19/006* (2013.01); *G09B 5/065* (2013.01)

(58) Field of Classification Search
CPC .... H04L 63/1483; G06T 19/006; G09B 5/065
See application file for complete search history.

(56) References Cited

U.S. PATENT DOCUMENTS

| 9,372,976 B2 | 6/2016 | Bukai |
| 9,659,303 B2 | 5/2017 | Orun et al. |
| 2014/0289867 A1* | 9/2014 | Bukai ............... G06F 21/44 726/28 |

(Continued)

FOREIGN PATENT DOCUMENTS

| AU | 2017101666 | 3/2018 |
| EP | 3823241 | 5/2021 |
| WO | WO2023/018642 | 2/2023 |

OTHER PUBLICATIONS

"Blended Learning," https://en.wikipedia.org/wiki/Blended_learning, Wikimedia Foundation, Inc., Sep. 6, 2023.

(Continued)

*Primary Examiner* — Wasika Nipa
(74) *Attorney, Agent, or Firm* — Weiss & Arons LLP

(57) ABSTRACT

A system, computer program product, and method for training users in phishing prevention may challenge a user with gamified user-specific phishing attacks for a user to encounter in a temporal pattern. Phishing data, including data relating to phishing techniques and actual and non-actual (fake) phishing attacks, may be generated or obtained and input to the training engine. User-related data, including user information, one or more social engineering vectors, or organization information relating to an organization, may be obtained and digitally manipulated. A sequential cross model training engine may process the phishing data and digitally manipulate the user-related data to generate training activities that include test phishing attacks. A gamification engine may generate gamified user-specific testing that includes two or more of the test phishing attacks in a sequence in real time. The test phishing attacks, which may be in a non-question format, may target the user in an XR environment.

16 Claims, 7 Drawing Sheets

(56) References Cited

U.S. PATENT DOCUMENTS

2014/0304054 A1* 10/2014 Orun .................. G06Q 30/0225
  705/14.26
2023/0388343 A1* 11/2023 Irimie .................... G06N 3/044
2023/0403298 A1* 12/2023 Silva ................... H04L 63/1483

OTHER PUBLICATIONS

"Cross-Sectional Study," https://en.wikipedia.org/wiki/Cross-sectional_study, Wikimedia Foundation, Inc., Jul. 7, 2023.
"Cross-Sequential Study," https://en.wikipedia.org/wiki/Cross-sequential_study, Wikimedia Foundation, Inc., Oct. 20, 2020.
"Longitudinal Study," https://en.wikipedia.org/wiki/Longitudinal_study, Wikimedia Foundation, Inc., Jun. 20, 2023.
Vaswani et al., "Attention Is All You Need," https://arxiv.org/pdf/1706.03762.pdf, Aug. 2, 2023.

* cited by examiner

GAMIFICATION OF TRAINING FOR PHISHING PREVENTION IN METAVERSE

FIELD OF THE DISCLOSURE

Aspects of the disclosure relate to using gamification to train users in preventing successful phishing attacks that are presented in a metaverse or mixed reality environment.

BACKGROUND OF THE DISCLOSURE

Hackers may use phishing techniques to trick users into providing confidential information, money, or other items. Confidential information, such as bank account or social security numbers, credit card details, or passwords, obtained by phishing may be used to obtain unauthorized access to something, such as access to systems, networks, or accounts. Past phishing techniques have typically used emails to pose a question to a recipient to elicit information from the user. Hackers have devised other phishing techniques, including techniques that may target users in an extended reality (XR) environment, like the metaverse (a virtual 3D environment) or mixed reality environment. Particularly in an XR environment, hackers may not limit the phishing attacks to asking a question. In an XR environment, they may lure a user into providing information by using a convincing avatar that may have an image or voice of someone who is familiar to the targeted user.

The XR environment, such as the metaverse or mixed reality environment, may operate in real time, which may make a user more susceptible to phishing in that environment because the user may have less time to consider whether phishing is occurring.

SUMMARY OF THE DISCLOSURE

It is an object of this invention to provide gamified phishing prevention training to teach users to recognize and prevent successful phishing attacks, especially phishing within the XR environment.

A gamified training system for phishing prevention training in an extended reality (XR) environment may be provided in accordance with the present disclosure. The system may include a first input that is configured to receive phishing data including first data relating to a plurality of phishing attacks and second data relating to a plurality of phishing techniques. The system may include a second input that is configured to receive digitally manipulated data including digitally manipulated user information, digitally manipulated user-related social engineered vectors, or digitally manipulated user-related organization information for one or more organizations with which the user interacts. The system may include a sequential cross model training engine for generating, based on the first and second inputs, user-specific phishing prevention training activities to be implemented according to a temporal pattern. The phishing prevention training activities may include a plurality of test phishing attacks, including test phishing attacks in the XR environment, to test responses of the user to the plurality of phishing attacks. The system may include a gamification engine that is configured to generate gamified testing that is user-specific. The gamification testing may incorporate two or more of the plurality of test phishing attacks in a sequence in real time in the XR environment to test responses of the user to the sequence of the two or more of the plurality of test phishing attacks to identify potential user vulnerabilities to different types of phishing attacks.

The first data received at the first input may include actual attack data relating to actual phishing attacks, and test-specific phishing attacks that have been generated for training purposes.

The system may include a plurality of generative models for machine learning wherein the generative models may be configured to generate a plurality of test phishing techniques based on the combination of the plurality of phishing attacks and the plurality of phishing techniques.

The gamification engine may be configured to generate a plurality of user profile vectors that each represents a different set of user characteristics. The gamification engine may be configured to generate one or more phishing navigation vectors that each represent a phishing navigation vector-specific training sequence and timing for the sequence of two or more test phishing attacks for use in a gamification environment. The gamification engine may be configured to match one or more of the phishing navigation vectors to one or more of the user profile vectors. The system may include a feature store for storing the one or more of the plurality of user profile vectors and phishing navigation vectors.

The XR environment may include a mixed reality environment or a metaverse environment. A user of the gamified training system may be a customer of a financial institution that allows banking transactions to be performed in the XR environment or may be a user that interacts with a different type of organization.

The sequential cross model training engine may include stacked autoencoders. The generative models may use stacked autoencoders.

The digitally manipulated data may include one or more of a text, a voice, a video, a vision, an image, an avatar, or an environment that has been digitally manipulated. The user-related data may be digitally manipulated by a Deepfake process. The system may include Deepfake encoders, such as stacked autoencoders, that digitally manipulate the digitally manipulated user information, the digitally manipulated user-related social engineered vectors, or the digitally manipulated user-related organization information. The user-related social engineered vectors may include information from or about the user based on user interaction with social media.

A gamified training system for phishing prevention training in an extended reality (XR) environment may be provided in accordance with the present disclosure. The gamified training system may include a first input that is configured to receive phishing data including first data relating to a plurality of phishing attacks and second data relating to a plurality of phishing techniques. The first data may be related to the plurality of phishing attacks includes a blending of actual phishing attack data for actual phishing attacks, including actual phishing attacks that have been used by hackers in the past, and test-specific phishing attack data that have been generated for testing purposes. The system may include a second input that is configured to receive digitally manipulated data including digitally manipulated user information, digitally manipulated user-related social engineered vectors, or digitally manipulated user-related organization information for one or more organizations with which the user interacts. The system may include a training engine that is configured to generate phishing prevention training activities for the user based on the first input and second inputs, where user-specific phishing prevention training activities may be implemented according to a temporal pattern. The phishing prevention training activities may include a plurality of test phishing attacks, including test phishing attacks in the XR environment, to test responses of the user to the plurality of phishing attacks. The system may include a gamification engine that is configured to generate gamified testing that is user-specific. The gamified testing may incorporate two or more of the plurality of test phishing attacks in a sequence in real time in the XR environment to test responses of the user to the sequence of the two or more of the plurality of test phishing attacks to identify potential user vulnerabilities to different types of phishing attacks.

The system may include a plurality of machine learning generative models that may be configured to generate a plurality of test phishing techniques based on the combination of the plurality of phishing attacks and the plurality of phishing techniques.

The gamification engine may be configured to generate a plurality of user profile vectors that each represents a different set of user characteristics. The gamification engine may be configured to generate one or more phishing navigation vectors that each represent a vector-specific training sequence and timing for a set of test phishing attacks for use in a gamification environment. The gamification engine may be configured to match one or more of the phishing navigation vectors to one or more of the user profile vectors.

The digitally manipulated data that is received at the second input may include one or more of a text, a voice, a video, a vision, an image, an avatar, or an environment that has been digitally manipulated. The user-related data may have been digitally manipulated by a Deepfake process.

A computer program product for phishing prevention training in an extended reality (XR) environment may be provided in accordance with the present disclosure. The computer program product may include executable instructions that, when executed by a processor on a first computer system, may receive or generate phishing data including first data relating to a plurality of phishing attacks and second data relating to a plurality of phishing techniques. The first data may be related to the plurality of phishing attacks includes a blending of actual phishing attack data for actual phishing attacks, including phishing attacks that have been used in the past, and test-specific phishing attack data that have been generated for testing purposes. The executable instructions may receive or generate digitally manipulated data including digitally manipulated user information, digitally manipulated user-related social engineered vectors, or user-related organization information for one or more organizations with which the user interacts. The executable instructions may generate, using sequential cross model training based on the phishing data and the digitally manipulated data, user-specific phishing prevention training activities to be implemented according to a temporal pattern. The phishing prevention training activities may include a plurality of test phishing attacks, including test phishing attacks in the XR environment, to test responses of the user to the plurality of phishing attacks. The executable instructions may generate gamified testing that is user-specific and incorporate two or more of the plurality of test phishing attacks in a sequence in real time in the XR environment to test responses of the user to the sequence of the two or more of the plurality of test phishing attacks to identify potential user vulnerabilities to different types of phishing attacks. The plurality of test phishing attacks may include a test attack in the XR environment in a non-question format.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
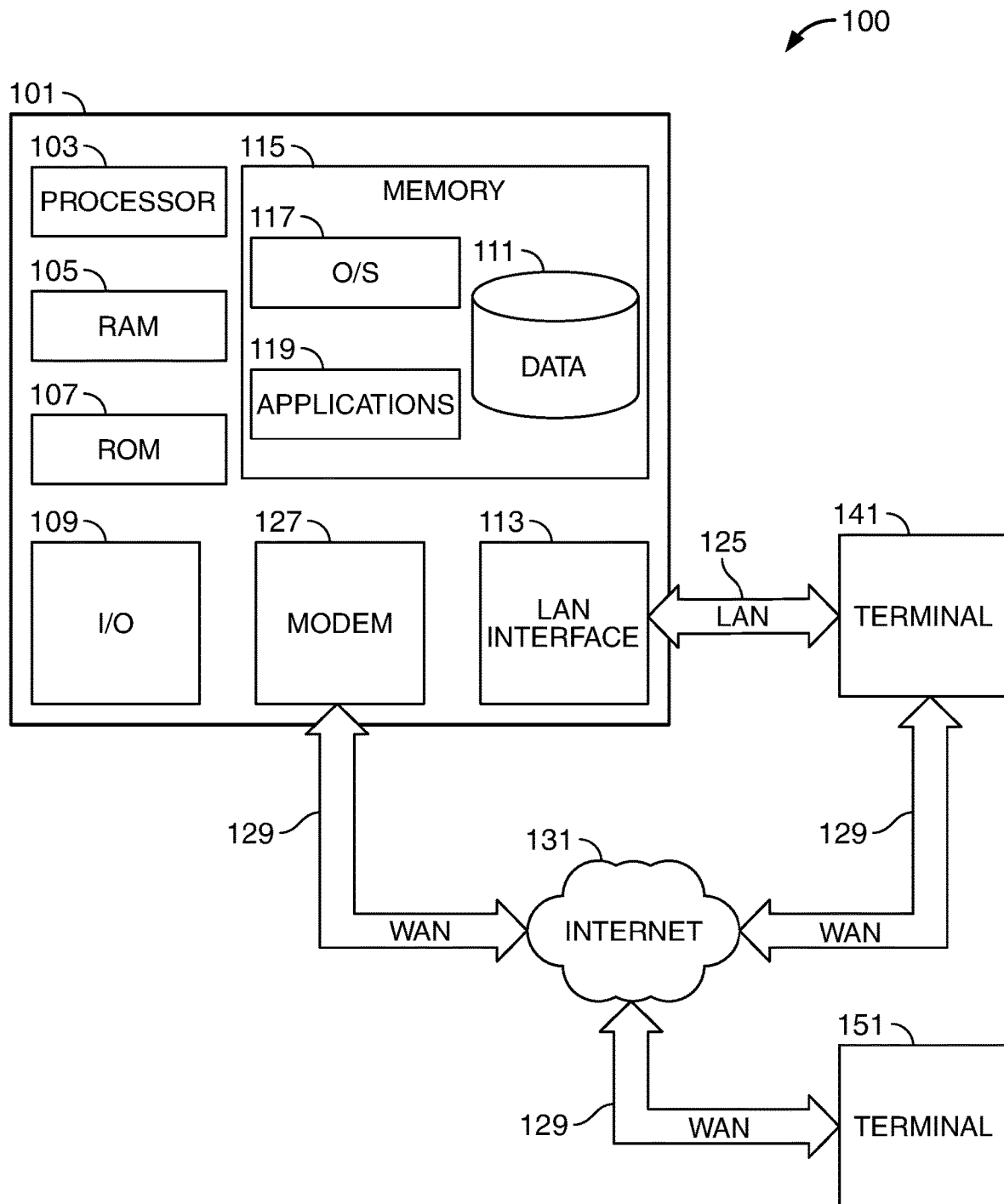
FIG. 1 shows an illustrative system architecture in accordance with principles of the disclosure.

The present disclosure relates to systems, computer program products, methods, and apparatus that use gamification to provide phishing prevention training to users that includes training about phishing techniques in an extended reality (XR) environment. The training may teach users how to identify the phishing attacks and avoid being misled into responding to them. The gamification may include training about potential phishing in a metaverse or mixed reality environment by testing the users with test phishing attacks. The gamification may incentivize participation, such as by scoring user training and advising users of their performance in phishing prevention activities. The training may be implemented by various types of organizations.

The test phishing attacks may be specifically generated for the training. The test phishing attacks may include one or more of attacks based on actual phishing attacks that hackers have used in the past and artificially-created phishing attacks, which may be termed "fake" phishing attacks. The fake phishing attacks may be different from the actual phishing attacks that have been previously used by hackers. The test phishing attacks may be generated by the training provider and may potentially be used by hackers in the future. Information about actual phishing attacks may be gleaned from various sources, including public reports, private sources, or previous phishing attacks against the organization or its employees. The "fake" phishing attempts may be generated in other ways, such as specifically for the gamified training system by machine learning or manually generated.

The training may include determining whether the user responds to the phishing attempts. A desirable response to the test phishing attack may be a non-response. A non-response will not divulge private information to hackers and may not trigger other phishing attempts by the hackers that might be otherwise triggered by any response. A non-response may include a lack of response over a predetermined time, such as an hour, a day, a week, or a different time period. Non-phishing communications may also be included during the gamification so that the users may be trained and scored based on distinguishing between phishing and non-phishing communications.

The training may include creating a real-life gamification environment in which users may be tasked with identifying different types of phishing attacks in an XR environment. An XR environment may include an augmented reality (AR) environment in which real world physical elements and virtual elements coexist, a metaverse environment that includes virtual reality (VR), or a mixed reality (MR) environment where real world physical elements may interact with the virtual elements.

The gamification environment may be overlaid onto an environment in which an organization and the user already interact. The training may be initiated during an established session between a user and an organization. The training may be initiated using a testing application, such as an application on an XR device. The application may be provided by the organization or a training vendor of the organization.

The training may aim to teach a user to become proficient in identifying different types of phishing. The training may involve more generalized training, for example, identifying anomalies in environment, images, tone, spelling or grammar. The training in an XR environment may include, for example, having a picture of someone in the organization known to the user and requesting something unusual, such as requesting from the user confidential information or money. The training may provide, for example, a phishing attack in the form of a communication from a bank that has an incorrect background environment with a logo for the wrong state in the United States. The training may be used to highlight other anomalies to which users should be alerted.

The training may use, for example, test calls, text messages, or avatars that may be customized to the user in a metaverse or mixed reality environment. Inputs to the gamified training system may be generated by Deepfake, which are digitally manipulated media to replace one person's likeness with that of another. Deepfake may manipulate a facial appearance, expression, or voice, of a person or some other video or audio content related to the person. The user's receipt of a Deepfake of the user may deceive a user into believing that the source of the communication which is a phishing attack is legitimate. The Deepfake of a different person, possibly someone from the organization that the user is supposedly interacting with may deceive a user into believing that the user is interacting with a legitimate person shown when, in actuality, the user is interacting with a hacker. The training may be based on a blended temporal model in which actual phishing attacks that have been used and fake phishing attacks may be generated as test phishing attacks to test the user over time (e.g., minutes, hours, days) to simulate actual phishing attacks that may be spread out over time. The blended temporal model may allow a gamified training system to generate phishing attacks that mirror an actual timeframe over which the user may experience actual phishing attacks.

The phishing attempts may include phishing attempts other than phishing by merely asking questions. For example, in an MR environment, the phishing attempts may use Deepfake representations of someone with whom the user may be familiar to engage in a discussion with a user as though the communication was initiated by the actual acquaintance. The discussion may lead to a request by the hacker for information or money.

The training may involve one or more of the following features:

1. Blending of Actual and Fake Phishing Attacks for XR Environment (such as AR/MR/VR): This feature may enable the user to be trained on possible fake phishing attacks that may be blended with actual phishing attacks that have been previously used. The new types of phishing attacks may use existing phishing techniques or new phishing techniques. By training a user to identify a blending of actual and fake phishing attacks, the user may be better prepared to avoid future successful phishing attacks against the user.

2. Sequential cross model training: A sequential cross model training may have a cross sequential design and a longitudinal design. A sequential cross model training engine may generate different temporal workflow events to reflect a workflow in phishing attacks, such as in complex phishing attacks. The training may allow learning from other phishing-type attacks so that the attacks during gamification may be generated for training in one or more specified sequences. The sequences may be similar to one or more sequences used in actual phishing attacks. For example, users may be sent several emails over a period of time (e.g., minutes, hours, days), and may then be sent a test phishing attack to the user's social media account or to the user's account in the metaverse.

3. Real-life environment and data (e.g., email, calls, or avatar): This feature enables a personalized cross-sectional study (CSS) in a real-life environment. Thus, for example, the phishing attack may include a call or an avatar in which a digitally manipulated voice has a familiar tone of an acquaintance of the user or the tone within a text of an email or a text message may be mimicked, or a digitally manipulated vision may be recreated in a mixed reality environment. The digital manipulation may be generated with the use of stacked autoencoders.

4. Navigation vector matched with a user profile: This feature enables creation of a user profile and a matching of the user profile with a navigation vector that specifies possible (simulated) phishing attacks in a temporal pattern, i.e., performed over time.

Multiple types of inputs may be sent to or obtained by the gamified training system.

One of the inputs may include one or more of user information, organization information, or social engineering vectors. This information may be passed to Deepfake models to reconstruct a similar input for a real time environment. Another input may include phishing information regarding N phishing techniques that have been used in phishing attacks and a blending of information about N actual phishing attacks that have occurred and M "fake" phishing attacks that may have not yet been actually used to attack users. The phishing information may be used to generate test phishing attacks. The phishing information may be used to generate N+M different types of phishing attacks that may use different phishing techniques. The data for the N+M phishing attacks may be stored in a Feature Store for storing data for possible reuse at a later time. Other data may be stored in the Feature Store, including user information, organization information, or social engineering vectors. The data in the Feature Store may be used for sequential cross model training.

In the cross model training, various inputs like text, voice, environment, and video may be used to exchange information among each other to understand phishing activity in other media. The cross model training may be applied to multiple encoders and decoders. However, encoder-decoder information flow may be one to one, i.e., between one encoder and one decoder. This step may be performed multiple times based on the user and environment activity.

The output from the sequential cross model training may be sent to the organization's gamified training system that may include third party applications operating within a mixed reality environment. The user may be able to interact with third party applications as well, such as call, text, and video. For example, a user's avatar may interact with an avatar for a bank relationship manager (RM) avatar. This avatar may be localized to the user.

The gamified training system may generate a phishing navigation vector and a user profile vector that may be captured in real time based on activity in the gamified training system by the user. The user profile vector may reflect information about the user, such as by categories like age group, education, and experience with the metaverse. A separate navigation vector may be generated for each user or for a group of users to generate the types and sequence of customized training with phishing attacks that may be provided to a user or users based on the user profile vector.

The navigation vector and user profile vector may be used for custom profiling of users. A user who experiences or may experience a certain type of phishing attack may be identified using these vectors.

Following the training, a user may be better able to identify the phishing attacks in which the user was trained in real time with more precision. If the user did not correctly recognize and ignore or avoid responding to all of the test phishing attacks, the training may resume with some or all of the same types of test attack activities (challenges) repeated, especially those which the user did not correctly identify. Test attacks in the XR environment may be emphasized by the training to teach users to identify such phishing attacks.

The gamified application may be initiated when a user logs into the metaverse of the organization, while the user is logged into the metaverse, or may be included in a separate training application.

Illustrative embodiments of methods, systems, and apparatus in accordance with the principles of the invention will now be described with reference to the accompanying drawings, which form a part hereof. It is to be understood that other embodiments may be used, and structural, functional, and procedural modifications may be made without departing from the scope and spirit of the present invention.

The drawings show illustrative features of methods, systems, and apparatus in accordance with the principles of the invention. The features are illustrated in the context of selected embodiments. It will be understood that features shown in connection with one of the embodiments may be practiced in accordance with the principles of the invention along with features shown in connection with another of the embodiments.

The methods, apparatus, computer program products, and systems described herein are illustrative and may involve some or all the steps of the illustrative methods and/or some or all of the features of the illustrative system or apparatus. The steps of the methods may be performed in an order other than the order shown or described herein. Some embodiments may omit steps shown or described in connection with the illustrative methods. Some embodiments may include steps that are not shown or described in connection with the illustrative methods, but rather are shown or described in a different portion of the specification.

FIG. 1 shows an illustrative block diagram of system 100 that includes computer 101. Computer 101 may alternatively be referred to herein as an "engine," "server" or a "computing device." Computer 101 may be any computing device described herein, such as the computing devices running on a computer, smart phones, smart cars, smart cards, and any other mobile device described herein. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all the elements described above relative to computer 101.

In some embodiments, computer 101 and/or Terminals 141 and 151 may be any of mobile devices that may be in electronic communication with consumer device 106 via LAN, WAN, or any other suitable short-range communication when a network connection may not be established.

When used in a LAN networking environment, computer 101 is connected to LAN 125 through a LAN interface 113 or an adapter. When used in a WAN networking environment, computer 101 may include a communications device, such as modem 127 or other means, for establishing communications over WAN 129, such as Internet 131.

In some embodiments, computer 101 may be connected to one or more other systems via a short-range communication network (not shown). In these embodiments, computer 101 may communicate with one or more other terminals 141 and 151, such as the mobile devices described herein etc., using a personal area network (PAN) such as Bluetooth®, NFC (Near Field Communication), ZigBee, or any other suitable personal area network.

It will be appreciated that the network connections shown are illustrative and other means of establishing a communications link between computers may be used. The existence of various well-known protocols such as TCP/IP, Ethernet, NFT, HTTP, and the like is presumed, and the system can be operated in a client-server configuration to permit retrieval of data from a web-based server or API (Application Programming Interface). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may use one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may use the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, and/or smartphones, multiprocessor systems, microprocessor-based systems, cloud-based systems, programmable consumer electronics, network PCs, minicomputers, mainframe computers, distributed computing environments that include any of the above systems or devices, and the like.

Figure 2:
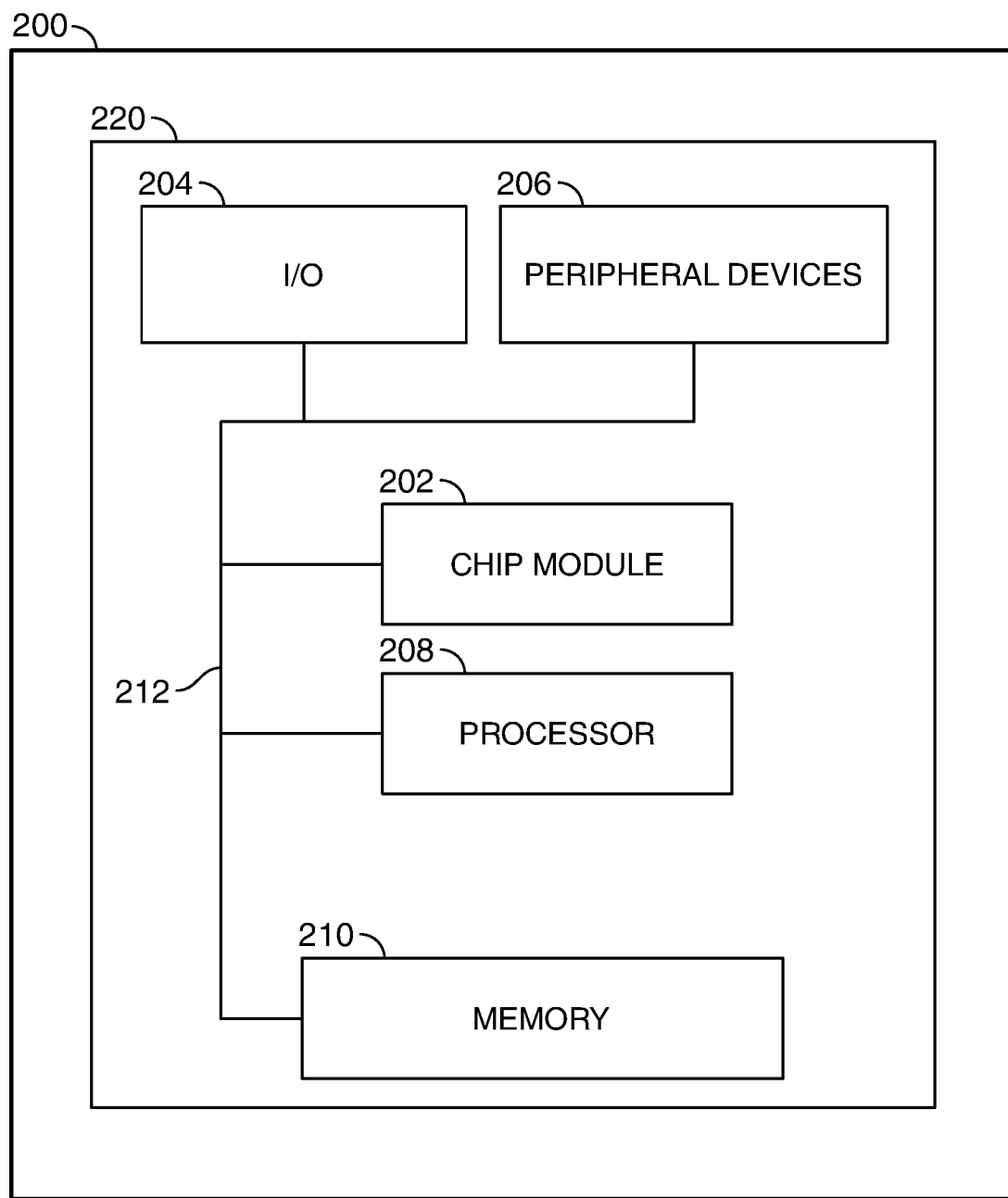
FIG. 2 shows an illustrative apparatus of a device in accordance with principles of the disclosure.

FIG. 2 shows illustrative apparatus 200, which may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
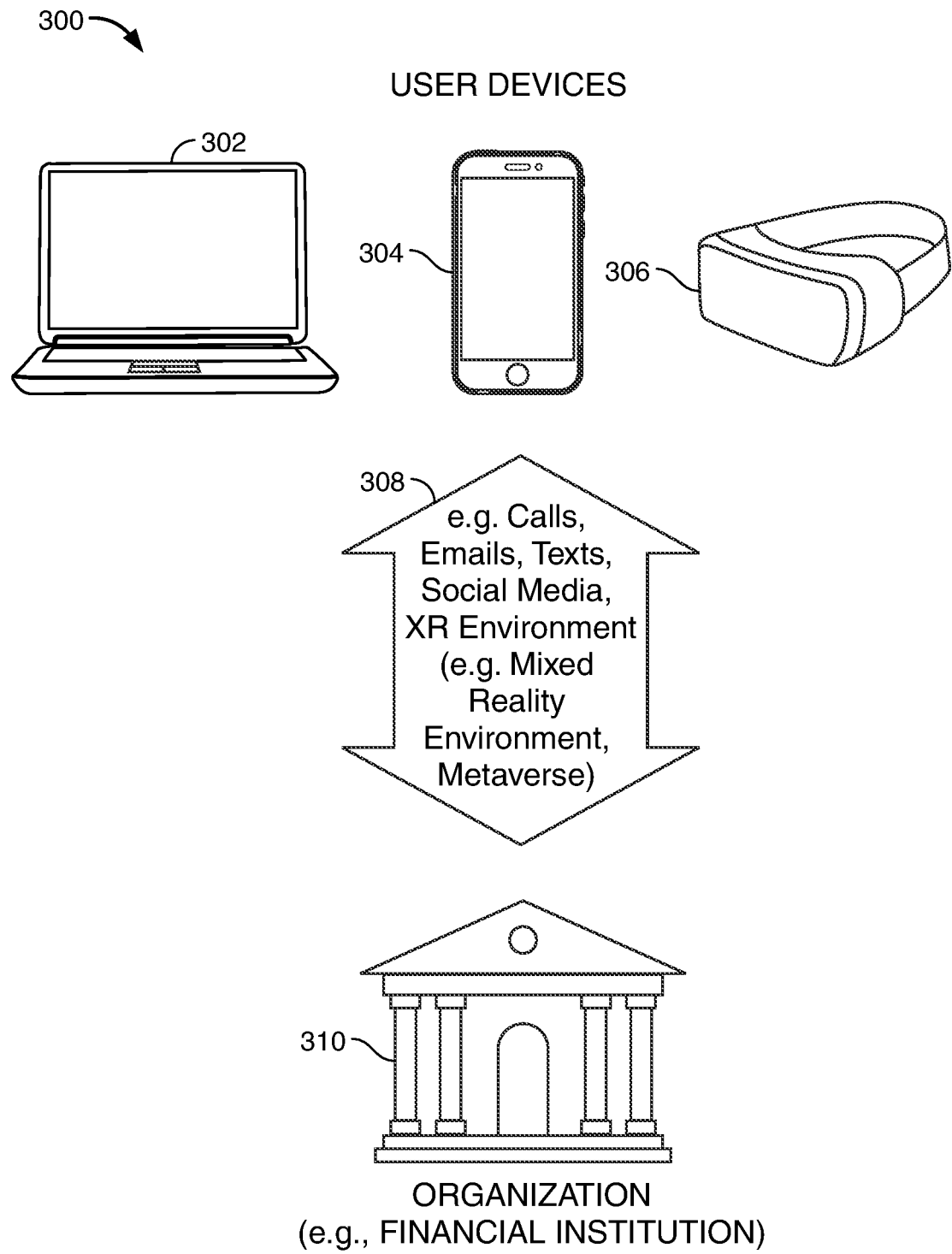
FIG. 3 shows an illustrative example of a system in which customers communicate with a financial institution in the metaverse in accordance with principles of the disclosure.

FIG. 3 shows an illustrative system 300 in which a user may use user devices to interact with an organization 310, such as with the organization's representatives or web site, in various ways. For example, the organization may be a financial institution, and the users may be customers or employees of the financial institution. As another example, the organization may be some other type of organization, such as another business, an educational institution, or a non-profit organization and the users may be employees or staff of that organization. As another example, the training may be provided to individuals by an educational organization with which the individuals may register for training. Examples of user devices that may be used for phishing prevention training may be computers 302, phones 304, or an XR device 306, such as smart glasses or an XR headset. One or more of these devices may be used, such as at 308, to talk, exchange emails, to engage with social media, or to interact via an extended reality (XR) environment. A user may encounter a phishing attack at one or more of the user devices. The organization may have its own servers, other hardware or software or may utilize resources on the cloud to engage with the user devices.

Figure 4:
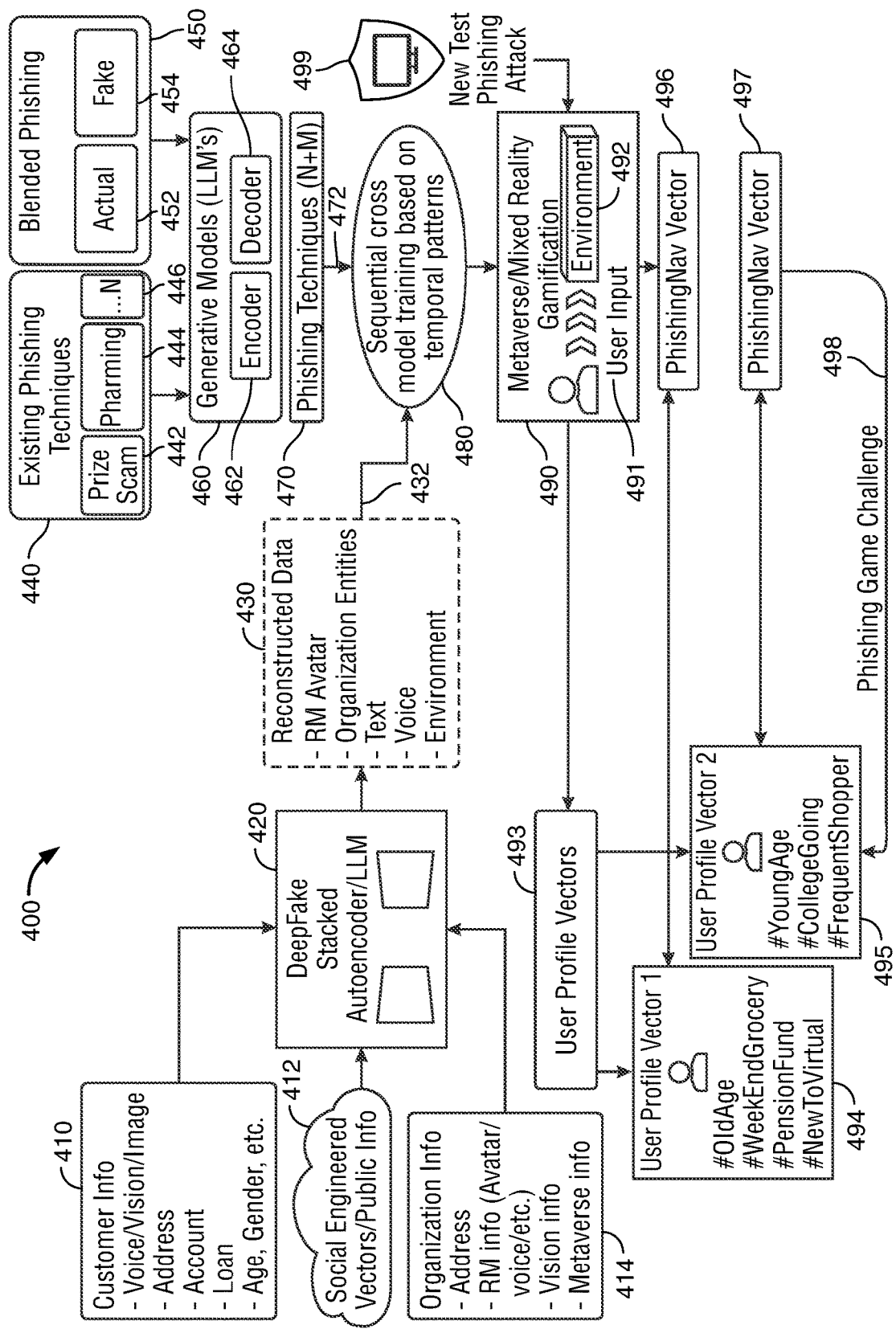
FIG. 4 shows an illustrative example of a workflow diagram for gamification that may be used in accordance with principles of the disclosure.

FIG. 4 shows an illustrative example of a gamification workflow diagram 400 for a phishing prevention gamified training system in accordance with the present disclosure. The gamification may be implemented across user devices.

The gamification may include generation of a sequence of test phishing attacks against the user that includes test phishing attacks within a mixed reality or metaverse environment. The gamification may include test phishing attacks in a non-XR environment. The phishing prevention gamified training system may be provided by the organization. The system may be operated by the organization or may be operated by a third party, with which the organization has a business arrangement.

In the illustrated workflow, information related to a user and the user's interaction with an organization may be obtained by the phishing prevention gamified training system. The organization may be a financial institution and the user may be a customer of the financial institution. The organization may alternatively be a non-financial organization with which a user interacts. The user may be a customer of the organization, and the information that may be obtained may include one or more of the user's customer information 410, social engineered vectors 412, and organization information 414. Customer information 410 may include information such as an image (vision), an address, an account number, loan information, age, or gender of the customer. Customer information 410 may be information that the organization already has for the user.

Social engineered vectors 412 may include information about the customer's social media presence, such as customer posts or comments. Social engineered vectors 412 may include public information that may be compiled from public searching, such as online searches, for social media relating to the customer. Information obtainable from social engineered vectors, like social media, may include content, writing or speaking style, and mannerisms.

Organization information 414 may include information about one or more organizations with which the user interacts. For example, organization information 414 may include an address of the organization, a relationship manager (RM) information for the user, a vision (image) information related to the organization, and metaverse information that the organization may use to participate in the metaverse. The relationship manager may be an actual person with whom the user has interacted in the past. Information about the information manager that may be available may include, for example, a voice or image of the relationship manager and an avatar that the relationship manager uses when interacting in the metaverse.

Customer information 410, social engineered vectors 412, and organization information 414 may be input to a Deepfake stacked autoencoder 420 to enable digital manipulation and encoding of user-related information, such as, for example, user attributes, and relationships with the organization and others. A stacked autoencoder includes multiple autoencoders stacked on top of one another. Autoencoder 420 may use a large language model (LLM), which is a machine learning model for natural language processing. Stacked autoencoders 420 may generate a real-life XR environment and data such as emails, calls, and an RM avatar. This feature may enable generation of a personalized cross-sectional study (CSS) that analyzes data at a particular point in time. The CSS may detect a tone of voice, a tone within text, or a vision (image) through the stacked autoencoders in an XR environment, such as a mixed reality environment.

The output of autoencoder 420 may be reconstructed data 430 that has been digitally manipulated to mislead the user. The reconstructed data may include an RM avatar that appears to be associated with the relationship manager but is not, and manipulated information about one or more of the organization entities, text, voice, and environment.

The gamification of the phishing prevention gamified training system may be based, at least in part, on data relating to phishing techniques 440 and phishing data regarding phishing attacks. Data related to phishing techniques and phishing attacks may be maintained in an organization's fraud detection system.

Data relating to phishing techniques 440 may include data that describes existing phishing techniques that have been encountered by various users. The phishing techniques may be techniques encountered by users in general or may be techniques encountered by users that interact with the organization. The phishing techniques may be based on records of phishing techniques provided to the organization that are known by the organization or by their users who may provide this information to the organization. A phishing technique may include, for example, a prize scam 442 in which a prize is promised in exchange for user information. Another example of a phishing technique may include pharming 444 in which a malicious code is installed on a user's computer to redirect the user to a fake, spoofed website. The phishing techniques may include various other types of phishing techniques, with as many as "N" different phishing techniques 446. N may be a whole number.

The phishing data 450 may include data related to actual phishing attacks 452 blended (combined) with data that may be generated by artificially generating fake phishing attacks 454, which have not been actually used, but may be created for testing purposes. The fake phishing attacks 454 may be test-specific attacks created for phishing prevention testing. This feature enables the user to be trained on possible new types of fake phishing attacks that may be generated for testing purposes. The fake phishing attacks may be created based on predictions of possible future phishing attacks. The fake phishing attacks may be blended with actual phishing attacks that have been previously used by hackers. The new types of phishing attacks may use existing phishing techniques or new phishing techniques. By training a user to identify a blending of actual and fake phishing attacks, the user may be better and more proactively prepared to avoid future successful phishing attacks against the user.

Data relating to phishing techniques 440 and blended phishing attacks 450 may be input to generative models 460 to be encoded and output at 470 as a blending of N actual and M fake phishing attacks for a total of N+M phishing attacks that use one or more phishing techniques. N is the number of actual phishing attacks and M is a total number of newly generated phishing attacks, where one or more of the N+M different phishing attacks may be used in gamification. Generative models may be LLM's and may include one or more encoders 462 and one or more decoders 464. The generative models may be multimodal with separate generative models provided for different types of elements in the metaverse or mixed reality, such as a separate generative model for each voice, vision, image, video, text, and environment. The models may be stacked.

The reconstructed data 430 and phishing techniques 470 may be input to a sequential cross model training engine 480 as inputs 432 and 472 respectively. Training engine 480 may use machine learning to determine which phishing attacks and techniques are targeting users in general and to which phishing attacks and techniques the training should be targeted. This determination may indicate which types of phishing techniques are most likely to be used against a current user. Training engine 480 may further use machine learning to determine in what sequences the phishing attacks are most likely to be encountered by users and may customize the training for this user accordingly by mimicking those sequences to generate a sequence of test phishing attacks. The types of phishing techniques and phishing attacks that may be used for testing may be based on a probabilistic determination by training engine 480 as to the types of techniques and attacks to which the user may be subjected in an actual non-testing environment.

Training engine 480 may rely on a neural network that sequentially passes through layers of the neural network. Each layer of the neural network may use different portions of the dataset to train a model. The neural network may be a recurrent neural network (RNN) in which teacher forcing may be used to train the weights of the RNN. The encoding of speech may use a Wav2Vec2 speech model. Training engine 480 may also use generative adversarial networks (GAN), and a connectionist temporal classification (CTC) beam search decoder, such as pyctcdecode, for speech recognition.

Training engine 480 may use the phishing data to generate different temporal pattern with a workflow of events for each user to be trained to reflect a workflow in complex phishing attacks. The training thus allows learning from the other phishing-type attacks and allows the attacks during gamification to be generated for training in a similar sequence as the actual phishing attacks.

The user-related data may be used by training engine 480 to generate user-customized phishing attacks. For example, statements by or about the user in social media may be used to generate a communication that is tailored to the user. When the user is in a mixed reality environment, for example, a test phishing attack may pretend to come from a relationship manager at the user's bank. A picture of the relationship manager and information about the user may be included in the phishing attack to make the attack seem realistic. The test phishing attacks to be used to test particular users may be selected based on the one or more user devices that the user is known to have. For example, certain test phishing attacks may be provided for use on a user if the user has a mobile device. Other test phishing attacks may be provided for use on an XR headset.

The models generated at 480 may be input to a gamified application 490 that may perform operations within an XR environment 492, such as a metaverse or mixed reality environment. The gamified application 490 may generate an environment 492. Environment 492 may be created for phishing prevention training and may be modified for use in testing. Environment 492 may be an environment that already exists and may be used by the gamified application 490. The user may use environment 492 to interact with and communicate with the organization (e.g., the financial institution), such as for conducting transactions. Test phishing attacks may be incorporated into the XR environment. The user may submit user input 491 to the gamified application 490. This may include responses to phishing attacks.

While in environment 492, the user may be sent a test phishing attack 499 to test whether the user responds to the phishing attack 499 and to ascertain, if the user does respond, what is the response. The test phishing attack may be in the form of an email, call, an avatar, or some other form. A test email may, for example, include a background or other observable features related to the organization. For a test phishing attack in an XR environment, visible elements that may be familiar to the user may be included. The preferred response may be for the user to not respond to the attack and not provide the requested information, money, or another requested item. The phishing attacks may include a sequence of more than one test phishing attack.

A user may be scored based on how many attacks the user successfully avoided, presumably because the attacks were detected. The scores may be provided to the user. A user may be told the user's scores and may receive an explanation of any mistakes. Additional training may be provided to a user, if warranted (e.g., if the user made some mistakes), after initial training with a sequence test phishing attacks.

A sequence of test activities selected for one user may be reused for others. The gamified training system may generate user profile vectors 493 that categorizes a user according to various characteristics based on user information obtained at 410. The user profile vector may be stored and used to categorize other users who have similar characteristics. For example, one user profile vector 494 may represent a group of users who are elderly, shop for groceries on weekends, have pension funds, and are new to virtual computing environment. Another user profile vector 495 may represent a different group of users who are young, going to college, and are frequent shoppers. Users categorized by a particular user profile vector may be trained in phishing prevention in a different manner than users who are categorized by a different user profile vector. Differentiated training may be implemented where it is determined that one group of users represented by a first user provide vector has different phishing prevention training requirements than a second group of users that are represented by a second user profile vector.

The gamified training system may also generate or select one or more phishing navigation vectors, such as, for example, phishing navigation vectors 496 and 497. The navigation vectors may specify a sequence in which specific test phishing attacks and timings in the sequence at which the test phishing attacks are sent. Other communications from the organization to the user may be interleaved with the test phishing attacks. The navigation vectors may also specify whether and how to continue testing the user until better responses are received. For example, if the user responds to a particular type of phishing attack, that type of phishing attack may be repeated based on a navigation vector.

Each user profile vector may be matched by the gamified training system to a particular phishing navigation vector. The matching may be made based on what navigation vector is best for training a group of users represented by a particular user profile vector. One type of user persona identified by a first user profile vector may be best matched to a first navigation vector and a second type of user persona may be best matched to a second navigation vector. For example, user profile vector 494 may be matched to navigation vector 496 and user profile vector 495 may be matched to phishing navigation vector 497.

By matching a user profile vector with a phishing navigation vector, future users who are trained by the gamified application 490 and who meet a user profile already established by an existing user profile vector may be tested based on phishing navigation sequences already established in the matched phishing navigation vector. Thus, for example, a sequence of phishing game challenges 498 set in a phishing navigation vector, such as phishing navigation vector 497, may then be used in the future by the gamified application 490 to test other users with a particular user profile vector, such as user profile vector 495.

Training may be initiated when a user enters an environment in which interactions between the user and the organization may interact. For example, the user may enter a mixed reality environment in which the user is permitted to interact with a bank. In embodiments, the interaction may be initiated by the user using an XR device which the user may use to log in to perform banking. In embodiments, training may be initiated using a training application, such as an organization-provided application, that enables the user to log in for training.

Figure 5:
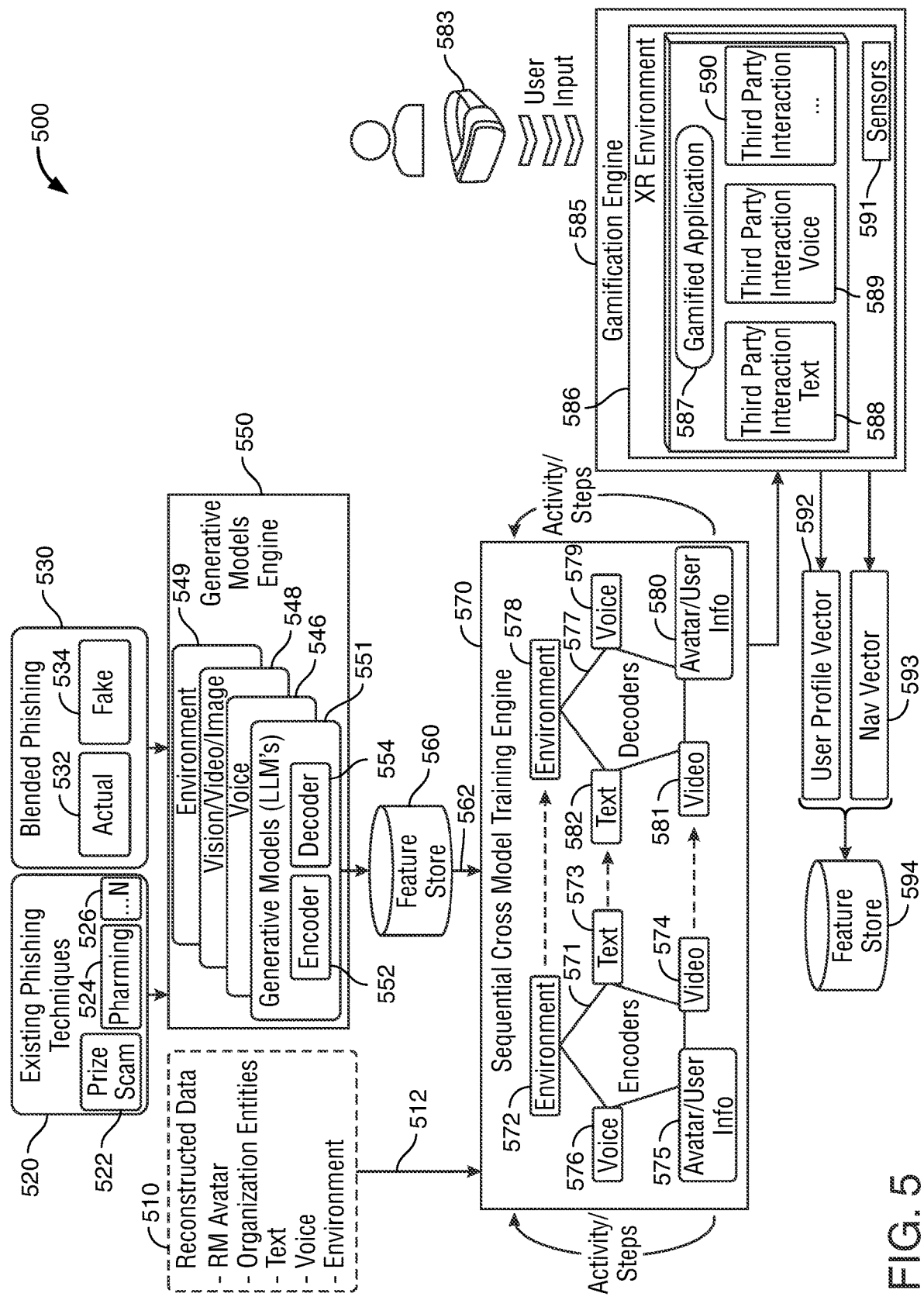
FIG. 5 shows an illustrative example of a system architecture for gamification in accordance with principles of the disclosure.

FIG. 5 shows an illustrative example of a system architecture 500 for gamification. At 510, reconstructed data, similar to reconstructed data at 430, may be input to a sequential cross model training engine. In addition, the gamification of the phishing prevention gamified training system may be based, at least in part, on phishing techniques 520, similar to 440, and a blended phishing that includes a blending of different types of actual and fake phishing attacks 530, similar to 450.

The types of phishing attacks 530 that may be blended (mixed) may include actual phishing attacks 532 and fake phishing attacks 534. Phishing techniques 520 may include existing phishing techniques, like prize scams 522, pharming 524, and as many as "N" 526 phishing techniques.

Phishing techniques 520 and blended phishing attacks 530 may be used to generate a voice 546, one or more of a vision, video, or image 548, and an environment 549 for test phishing attacks.

Phishing techniques 520 and blended phishing attacks 530 may be input to a generative models engine 550. Generative models engine 550 may each include a respective encoder 552 and a decoder 554 to create generative models. The generative models may be LLM's which may use one or more encoders 462 and one or more decoders 464. An encoder may receive an input and a decoder may decode the input. Generative model engine 550 may output the phishing techniques to be used. A copy of features that are outputs from the generative models may optionally be stored at a feature store 560 where the features may be reused later for other phishing training. A voice 546, a vision, video, or image 548, and an environment 549 for phishing may be included with the generated models to generate datasets for phishing. The datasets of features may be optionally stored at feature store 560 along with the generative models for current and future phishing training.

Reconstructed data 510 may be input over link 512 and features output from feature store 560 may be input to sequential cross model training engine 570 along with features for phishing techniques that may be generated by generative models 551. Sequential cross model training engine 570 may use the obtained information to train the models to learn the types and techniques of phishing attacks and use the supplied reconstructed data 510 by encoding the received information from links 512 and 562 using encoders 571 and decoders 577. Encoders 571 may copy the information that is input within each model. Decoders 577 may try to reconstruct what has been encoded. This may assist in learning whether the respective generative model is working correctly. Engine 570 may use a separate one of encoders 571 to encode different types of data such as environment 572, text 573, video 574, avatar or other user information 575, or voice 576 and a separate one of decoders 577 to decode a type of encoded data, including environment 578, voice 579, avatar or other user information 580, video 581, or text 582 for output. The combination of encoders and decoders may be stacked autoencoders that may be used to extract the ideal features to test for phishing.

Some examples of features that a user may be trained to observe as an indication of a phishing attack may be spelling or grammatical mistakes and Deepfakes. In the XR environment, it may be more difficult to detect phishing attacks, but engine 570 may be able to teach users to detect these attacks by looking for anomalies or mistakes in the attacks.

The output of the sequential cross model training engine 570 may be input to a gamification engine 585 that is configured for performing gamification in an XR environment 586 (e.g., a VR, AR, or MR environment), which may be a real-time environment. The XR environment may include a gamified application 587 that is configured to interact with third parties, such as the users who are being trained to prevent phishing attacks. The interactions may include, for example, interactions by text 588, voice 589, and other types of interactions 590. A user may interact with and input information to the XR environment 586 using an XR device 583, such as smart glasses or an XR headset. XR device 583 may include sensors 591, which may or may not be used for phishing prevention training. Sensors 591 may be, for example, temperature sensors, smell sensors, or heart sensors. Gamified application 587 may provide outputs including one or more user profile vectors 592 and one or more phishing navigation vectors 593.

User profile vectors 592 may include features that categorize users of gamified application 587. For example, user profile vectors 592 may be similar to user profile vectors 493. Navigation vectors 593 may be similar to phishing navigation vectors 496, 497 as described above. User profile vectors and navigation vectors may be stored in a feature store 594. Feature store 594 may be different from or the same feature store as feature store 560. The storage of the vectors in feature store 594 enables future use of the vectors to train other users of the gamified training system who may be categorized by one of the same user profile vectors. Users with the same user profile vectors may be trained in accordance with a navigation vector that has been matched to that user profile vector.

Figure 6:
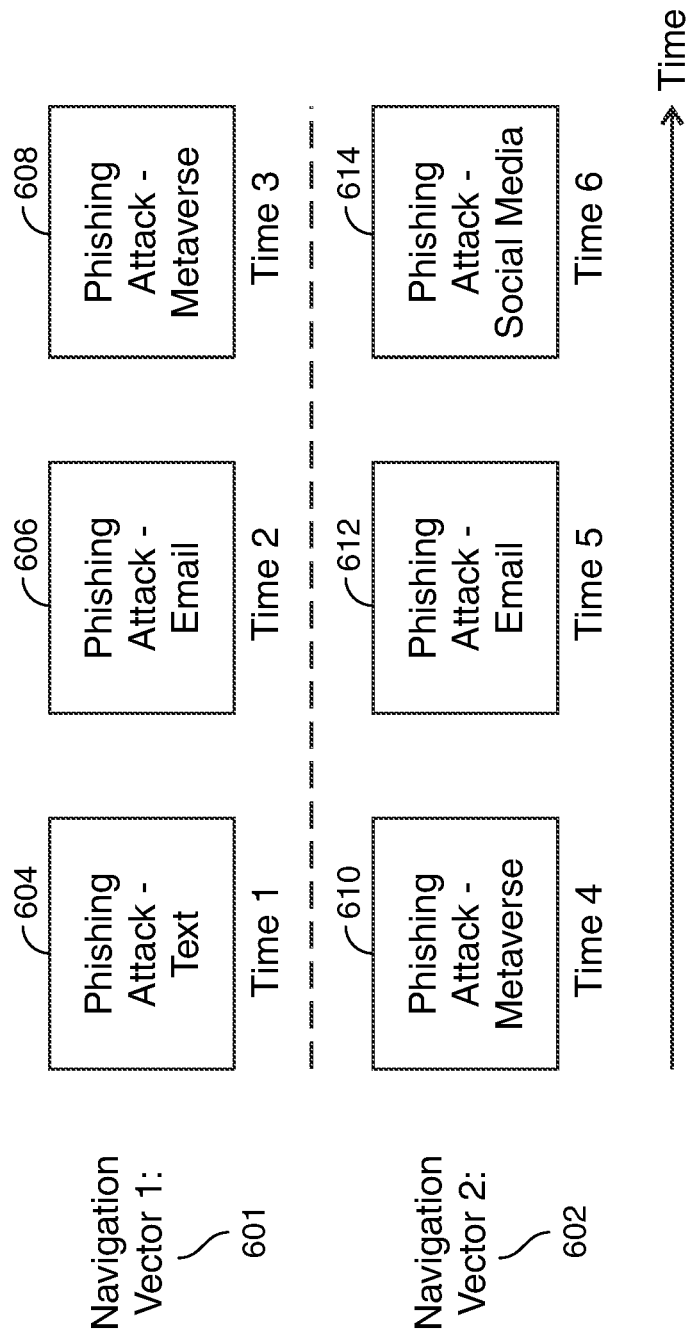
FIG. 6 shows illustrative navigation vectors that may be used with the phishing prevention system in accordance with principles of the disclosure.

FIG. 6 shows illustrative examples of phishing navigation vectors that may reflect the targeting of users temporally by different communication methods. Phishing navigation vector 601 may reflect phishing training for a first user. Phishing navigation vector 602 may reflect phishing training for a second user. Phishing navigation vector 601 may include a first phishing attack 604 sent to the first user by text message at Time 1, followed by a phishing attack 606 sent to the first user by email at Time 2, followed by a phishing attack 608 sent to the first user in the metaverse at Time 3. Phishing navigation vector 602 may include a first phishing attack 610 sent to the second user in the metaverse at Time 4, followed by a phishing attack 612 sent by email to the second user at Time 5, followed by a phishing attack 608 to the second user's social media account at Time 6.

During the training, non-phishing communications may be interleaved within the phishing attacks to reflect that phishing attacks may be interleaved with non-phishing communications.

Figure 7:
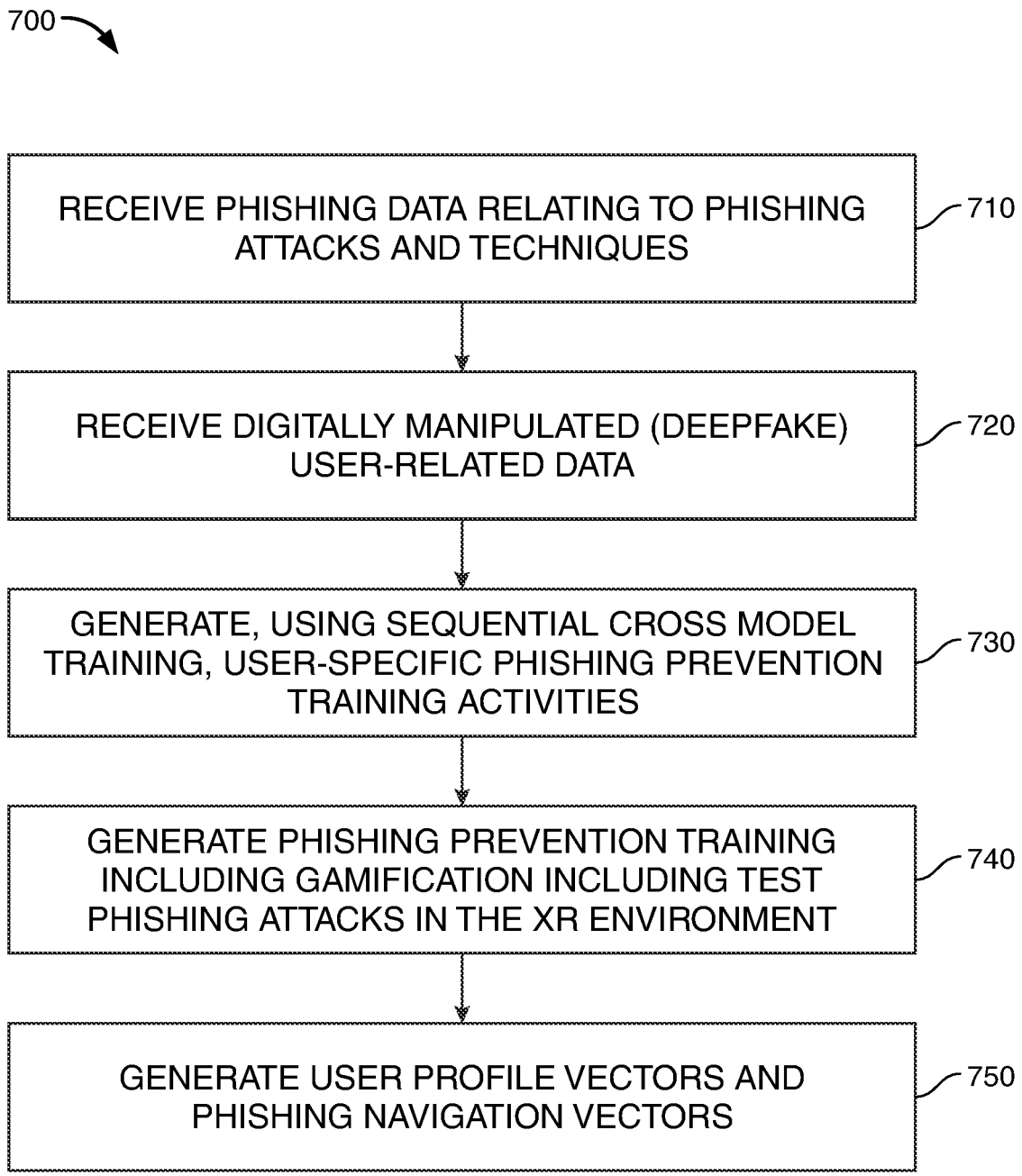
FIG. 7 shows an illustrative example of a flow chart of a phishing prevention method that may be performed in accordance with principles of the disclosure.

FIG. 7 shows an illustrative flow chart of steps that may be performed to generate user-specific phishing prevention training.

At step 710, the system may receive phishing data related to phishing attacks and phishing techniques. Some of the phishing data may be generated for testing by the gamified training system. The phishing attack data may include information about the nature of the attacks (e.g., prize scams, pharming, etc.) and the timing of the same. The phishing attack data may include data for the actual and the fake phishing attacks. The phishing technique data may include data relating to different phishing techniques that have been used to target users in general.

At step 720, digitally manipulated (e.g., Deepfake) user-related data may be received. The digitally manipulated user-related data may be based on user-related data that an organization already compiles for the user during its dealing with the user. Other data, such as a user's social media data may be obtained by the organization. Organization information may be data already in the possession of the organization or data that the organization may obtain from other sources, such as news reports and ratings about the organization. For example, where the user is a bank customer, the user-related data may be data maintained by the bank for that customer. The information that the bank has about the customer may have been provided by the customer or collected by the bank from other sources. Step 720 may be performed before, after or simultaneously with step 710.

At step 730, a sequential cross model training engine may generate user-specific phishing prevention training activities to be performed in a temporal pattern including test phishing attacks in an XR environment.

At step 740, gamified phishing prevention training activities may be generated. Test phishing attacks may be targeted to a user over a period of time, including one or more test phishing attacks in the XR environment in a sequence in real time. The gamified training system may alert the user as to a score that reflects the number of correct and incorrect user responses to the test phishing attacks that were sent to the user. The gamified training system may also retest the user, possibly with different test phishing attacks, such as if the user made one or more mistakes.

At step 750, a user profile vector and a phishing navigation vector may be created. The vectors may be stored in a feature store. The vectors may be reused by the gamified training system for another user who has a similar user profile so that the gamified training system may reuse the sequence of test phishing attacks against another similarly categorized user.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods, systems, apparatuses, and computer program products gamified phishing prevention training, especially against phishing attacks in an XR environment, may be provided. Persons skilled in the art will appreciate that the present invention can be practiced by other than the described embodiments, which are presented for purposes of illustration rather than of limitation.

What is claimed is:

1. A gamified training system for phishing prevention training of a user in an extended reality (XR) environment, wherein the gamified training system comprises:
 a hardware processor and a memory;
 a first input that is configured to receive phishing data including first data relating to a plurality of phishing attacks and second data relating to a plurality of phishing techniques;
 a second input that is configured to receive digitally manipulated data including digitally manipulated user information, digitally manipulated user-related social engineered vectors, or digitally manipulated user-related organization information for one or more organizations with which the user interacts;
 a sequential cross model training engine for generating, based on the first and second inputs, user-specific phishing prevention training activities to be implemented according to a temporal pattern, wherein the user-specific phishing prevention training activities comprise a plurality of test phishing attacks, including test phishing attacks in the XR environment, to test responses of the user to the plurality of phishing attacks;
 a gamification engine that is configured to generate gamified testing that is user-specific and incorporate two or more of the plurality of test phishing attacks in a sequence in real time in the XR environment to test responses of the user to the sequence of the two or more of the plurality of test phishing attacks to identify potential user vulnerabilities to different types of phishing attacks; and
 a plurality of generative models for machine learning wherein the generative models are configured to generate a plurality of test phishing techniques based on the combination of the plurality of phishing attacks and the plurality of phishing techniques;
 wherein:
 the first data received at the first input comprises actual phishing attack data relating to actual phishing attacks and test-specific phishing attack data that have been generated for training purposes; and
 the gamification engine is further configured to generate one or more phishing navigation vectors that each represent a phishing navigation vector-specific training sequence and timing for the sequence of the two or more of the plurality of test phishing attacks for use in a gamification environment.

2. The system of claim 1, wherein the gamification engine is further configured to generate a plurality of user profile vectors that each represents a different set of user characteristics.

3. The system of claim 2, wherein the gamification engine is further configured to match one or more of the phishing navigation vectors to one or more of the plurality of user profile vectors.

4. The system of claim 2, further comprising a feature store for storing for the one or more of the plurality of user profile vectors and the phishing navigation vectors.

5. The system of claim 1, wherein the XR environment comprises a mixed reality environment or a metaverse environment.

6. The system of claim 1, wherein the user is a customer of a financial institution that allows banking transactions to be performed in the XR environment.

7. The system of claim 1, wherein the sequential cross model training engine comprises stacked autoencoders.

8. The system of claim 1, wherein the digitally manipulated data that is received at the second input includes one or more of a text, a voice, a video, a vision, an image, an avatar, or an environment that has been digitally manipulated.

9. The system of claim 1, wherein the digitally manipulated data has been digitally manipulated by a Deepfake process.

10. The system of claim 1, wherein the user-related social engineered vectors comprise information from or about the user based on user interaction with social media.

11. A gamified training system for phishing prevention training of a user in an extended reality (XR) environment, wherein the system comprises:
- a hardware processor and a memory;
- a first input that is configured to receive phishing data including first data relating to a plurality of phishing attacks and second data relating to a plurality of phishing techniques, wherein the first data related to the plurality of phishing attacks includes a blending of actual phishing attack data for actual phishing attacks and test-specific phishing attacks that have been generated for testing purposes;
- a second input that is configured to receive digitally manipulated data including digitally manipulated user information, digitally manipulated user-related social engineered vectors, or digitally manipulated user-related organization information for one or more organizations with which the user interacts;
- a training engine that is configured to generate phishing prevention training activities for the user based on the first and second inputs, user-specific phishing prevention training activities to be implemented according to a temporal pattern, wherein the user-specific phishing prevention training activities comprise a plurality of test phishing attacks, including test phishing attacks in the XR environment, to test responses of the user to the plurality of phishing attacks;
- a gamification engine that is configured to generate gamified testing that is user-specific and incorporate two or more of the plurality of test phishing attacks in a sequence in real time in the XR environment to test responses of the user to the sequence of the two or more of the plurality of test phishing attacks to identify potential user vulnerabilities to different types of phishing attacks; and
- a plurality of generative models for machine learning wherein the generative models are configured to generate a plurality of test phishing techniques based on the combination of the plurality of phishing attacks and the plurality of phishing techniques;
- wherein the gamification engine is further configured to generate one or more phishing navigation vectors that each represent a phishing navigation vector-specific training sequence and timing for the sequence of the two or more of the plurality of test phishing attacks for use in a gamification environment.

12. The system of claim 11, wherein the gamification engine is further configured to generate a plurality of user profile vectors that each represents a different set of user characteristics.

13. The system of claim 11, wherein the gamification engine is further configured to match one or more of the phishing navigation vectors to one or more of the plurality of user profile vectors.

14. The system of claim 11, wherein the digitally manipulated data that is received at the second input includes one or more of a text, a voice, a video, a vision, an image, an avatar, or an environment that has been digitally manipulated.

15. The system of claim 11, wherein the digitally manipulated data has been digitally manipulated by a Deepfake process.

16. A computer program product for phishing prevention training of a user in an extended reality (XR) environment, wherein the computer program product comprises non-transitory computer readable medium and executable instructions that, when executed by a processor on a first computer system:
- receive or generate phishing data including first data relating to a plurality of phishing attacks and second data relating to a plurality of phishing techniques;
- receive or generate digitally manipulated data including digitally manipulated user information, digitally manipulated user-related social engineered vectors, or user-related organization information for one or more organizations with which the user interacts;
- generate, using sequential cross model training based on the phishing data and the digitally manipulated data, user-specific phishing prevention training activities to be implemented according to a temporal pattern, wherein the user-specific phishing prevention training activities comprise a plurality of test phishing attacks, including test phishing attacks in the XR environment, to test responses of the user to the plurality of phishing attacks; and
- generate gamified testing that is user-specific and incorporate two or more of the plurality of test phishing attacks in a sequence in real time in the XR environment to test responses of the user to the sequence of the two or more of the plurality of test phishing attacks to identify potential user vulnerabilities to different types of phishing attacks, wherein the plurality of test phishing attacks comprise a test attack in the XR environment in a non-question format;
- wherein:
- the first data received at the first input comprises actual phishing attack data relating to actual phishing attacks and test-specific phishing attack data that have been generated for training purposes; and
- the executable instructions, when executed by the processor at the first computer system, further:
- generate a plurality of test phishing techniques using a plurality of generative models for machine learning based on the combination of the plurality of phishing attacks and the plurality of phishing techniques; and
- generate one or more phishing navigation vectors that each represent a phishing navigation vector-specific training sequence and timing for the sequence of the two or more of the plurality of test phishing attacks for use in a gamification environment.

* * * * *